United States Patent [19]
Johnson

[11] Patent Number: 6,029,608
[45] Date of Patent: Feb. 29, 2000

[54] ANIMAL CONTAINMENT DEVICE

[76] Inventor: Terry D. Johnson, 75 Ferndale Rd., Wayzata, Minn. 55391

[21] Appl. No.: 09/126,286

[22] Filed: Jul. 30, 1998

[51] Int. Cl.⁷ .................... A01K 1/01; A01K 1/02
[52] U.S. Cl. .................. 119/436; 119/450; 119/447; 119/444
[58] Field of Search ................... 119/436, 438, 119/450, 444, 447, 530, 527, 528, 529, 500

[56] References Cited

U.S. PATENT DOCUMENTS

| | | | |
|---|---|---|---|
| 427,547 | 5/1890 | Brewer | 119/450 |
| 1,676,570 | 7/1928 | Mugler | 119/444 |
| 3,137,270 | 6/1964 | Rigterink et al. | 119/450 |
| 3,601,096 | 8/1971 | Rutherford | 119/450 |
| 3,802,390 | 4/1974 | Blair et al. | 119/450 |
| 4,231,325 | 11/1980 | Parks | 119/450 |
| 4,323,033 | 4/1982 | Vosyka et al. | 119/436 |
| 4,353,328 | 10/1982 | Steidinger | 119/447 |
| 4,706,607 | 11/1987 | Ijichi et al. | 119/447 |
| 5,732,685 | 3/1998 | Nakamura | 123/514 |

*Primary Examiner*—Peter M. Poon
*Assistant Examiner*—Judith A. Nelson
*Attorney, Agent, or Firm*—Zarley, McKee, Thomte, Voorhees & Sease

[57] ABSTRACT

The invention is an animal containment device for the transportation, holding, feeding, watering, and caring for of animals. The device is designed to maintain adequate temperature, humidity, ventilation, and sanitary conditions. The device includes a ventilation device which can operate in negative, positive, or atmospheric pressure modes. The device also includes a multi-level waste and by-product removal device. The waste and by-product removal device consists of multiple slotted layers through which liquids and solids will pass. These liquids and solids will be collected on different layers upon which they can be dried and easily removed. This device eliminates odor and contamination within the device. The device allows for special handling, the ability to isolate/quarantine, and the ability to provide easy animal ingress/egress. The device allows for warm and dry nesting, provides healthy human working conditions, allows the animals to obtain adequate rest, allows the animals to receive sunlight, and is rodent and insect free.

6 Claims, 4 Drawing Sheets

ANIMAL CONTAINMENT DEVICE

BACKGROUND OF THE INVENTION

A. Field of the Invention

This present invention relates to animal containment and, in particular, to the raising of animals in isolated environmental conditions.

This invention allows the user to raise a quantity of animals from time of purchase to time of sale in one unit under substantially uniform conditions. It allows for the easy removal of all waste and by-products. It allows for positive, negative, or atmospheric pressurization. It allows for the adequate viewing of and access to the contained subjects. It may be modified for a variety of uses including a dog kennel, a quarantine laboratory, or a quarantined/emergency sleeping area.

B. Problems in the Art

A variety of devices currently exist for the purposes of breeding, farrowing, nursing, and finishing animals. Each purpose currently requires a separate specialized device. None of the current devices are capable of maintaining a positive pressurization. All current devices are either negatively pressurized or operate at atmospheric pressure. A positively pressurized system could eliminate the need for non-corrosive moisture resistant, high pressure fans, especially designed inlets, electronic controllers, and room heaters. Negative systems require precise and accurate control of exhaust fan speeds and input. Current ventilation systems require variable speed fans, fan shutters, fan propeller guards, fan windbreaks, electronic controllers, room air intakes, attic air roof cupolas, circulating fans and room heaters. Many have become so complex that they are computer controlled. They allow for little, if any, control over the air conditions in the plenum chamber. If the air inside the plenum chamber could be controlled and then pushed into the room, rather than being sucked out of the room, the room's temperature, humidity, and pressure could be more easily maintained.

Current devices which treat waste or by-products of animals currently require a chemical treatment process to help remove odor and properly prepare the waste or byproducts for reuse as fertilizer. Current systems which do not require chemical treatment are very odorific or do not allow for the easy removal of waste and by-products. Current devices uses slotted flooring to remove waste and byproducts from the proximity of the animal. However, these devices then either collect the waste and by-products in lagoons or cesspools or chemically treat the waste and byproducts. None of these current devices separate the liquid from the solid waste or by-products.

It is therefore a principal objective of the present invention to provide an animal containment device that can be used for breeding, farrowing, nursing, and finishing of animals.

It is a further objective of this invention to provide a device capable of maintaining a positive, negative, or atmospheric pressurization.

It is a further objective of this invention to provide a device capable of controlling temperature and humidity within a containment area.

It is a further objective of this invention to provide a device capable of a chemical free treatment of waste and byproducts to remove odor and prepare the waste and by-products for future use.

A still further object of the present invention is to provide a device that allows for the easy removal of waste and by-products.

A still further object of the present invention is to provide a device that is disease, insect and rodent free.

SUMMARY OF THE INVENTION

The present invention relates to an animal containment device for use in breeding, farrowing, nursing, and finishing of animals. The invention allows for each of these purposes to be carried on within one housing unit. This housing unit is connected to a ventilation system which is designed to maintain the proper temperature, humidity, ventilation and sanitary conditions of the animals. This ventilation system is designed to require relatively low levels of maintenance. The ventilation system will allow for positive, negative, or atmospheric pressurization of the containment device.

A waste removal system is attached to the ventilation system within the housing to allow for the easy removal and treatment of waste and by-products. This waste treatment system provides a chemical free means of removing odor and preparing waste and by-products for future use as fertilizer. This waste treatment device allows for the easy removal of treated waste and by-products.

Through the use of a means to separate liquid and solid waste and/or by-products, a waste removal system which prevents the animals from wallowing in waste and/or byproducts, and a chemical-free method of preventing treating waste for by-products, the device has the ability to provide a disease, insect, rodent, and odor-free environment.

In operation, the animal containment device allows the user to raise a quantity of animals from time of purchase to time of sale in one unit in substantially uniform sanitary conditions.

DETAILED DESCRIPTION OF THE PREFERRED EMBODIMENT

Figure 1:
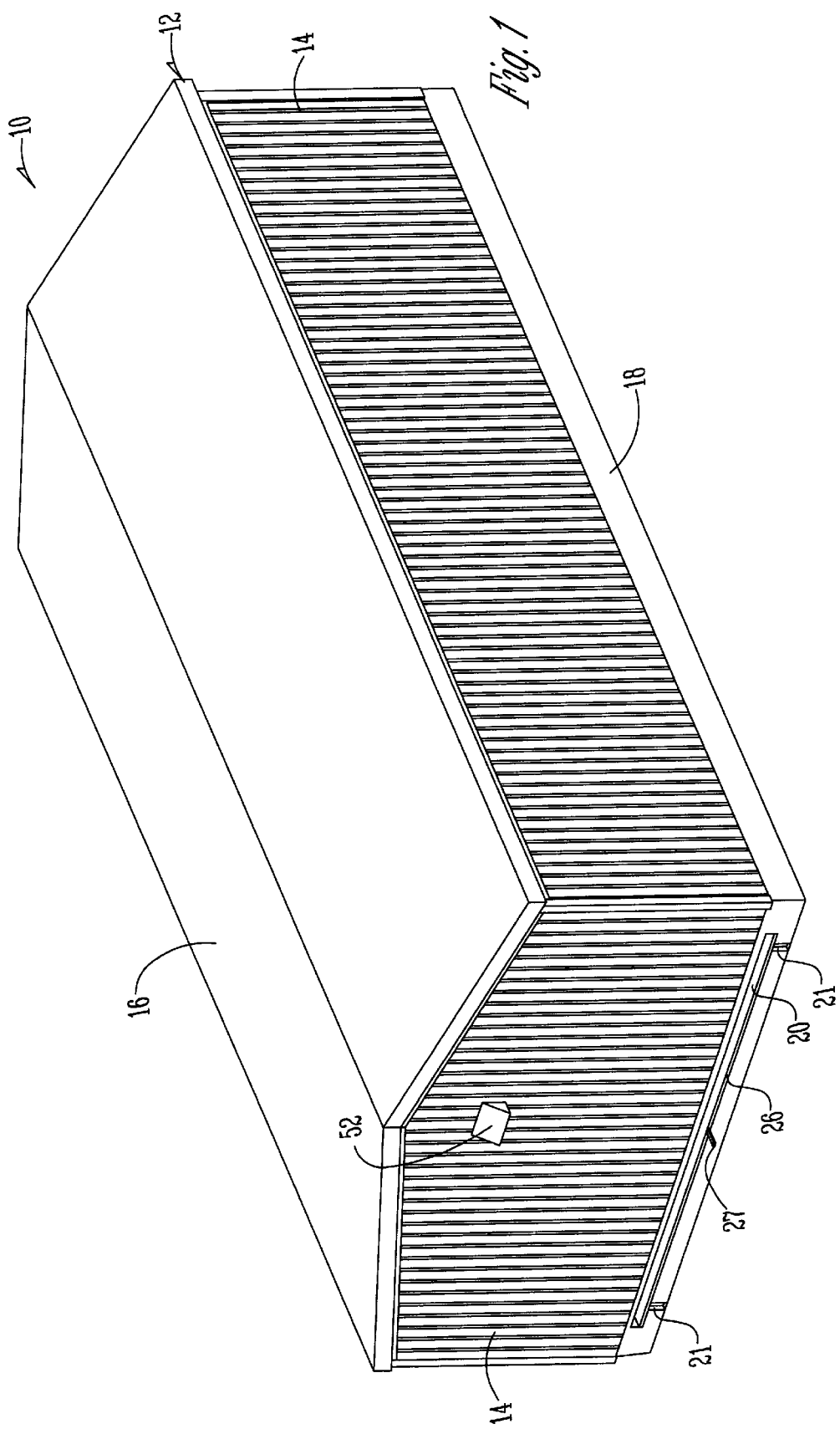
FIG. 1 is an external view of the animal containment device containing a preferred embodiment of the housing unit.

To provide a better understanding of the invention, one preferred embodiment of the invention will now be described in detail. It is to be understood that the preferred embodiment discussed below is but one form of the invention and is not exclusive.

The description will make frequent reference to the accompanying drawings. Reference numerals and/or letters will be utilized to indicate certain parts or locations in the drawings. The same reference numbers and letters will be used to indicate the same parts or locations in all of the drawings unless otherwise indicated.

FIG. 1 depicts one embodiment of the animal containment device 10. The housing unit 12 of the animal containment device 10 consists of four walls 14, a roof 16, a base 18 and an access area for waste removal 20 and wheel slot 21.

Figure 2:
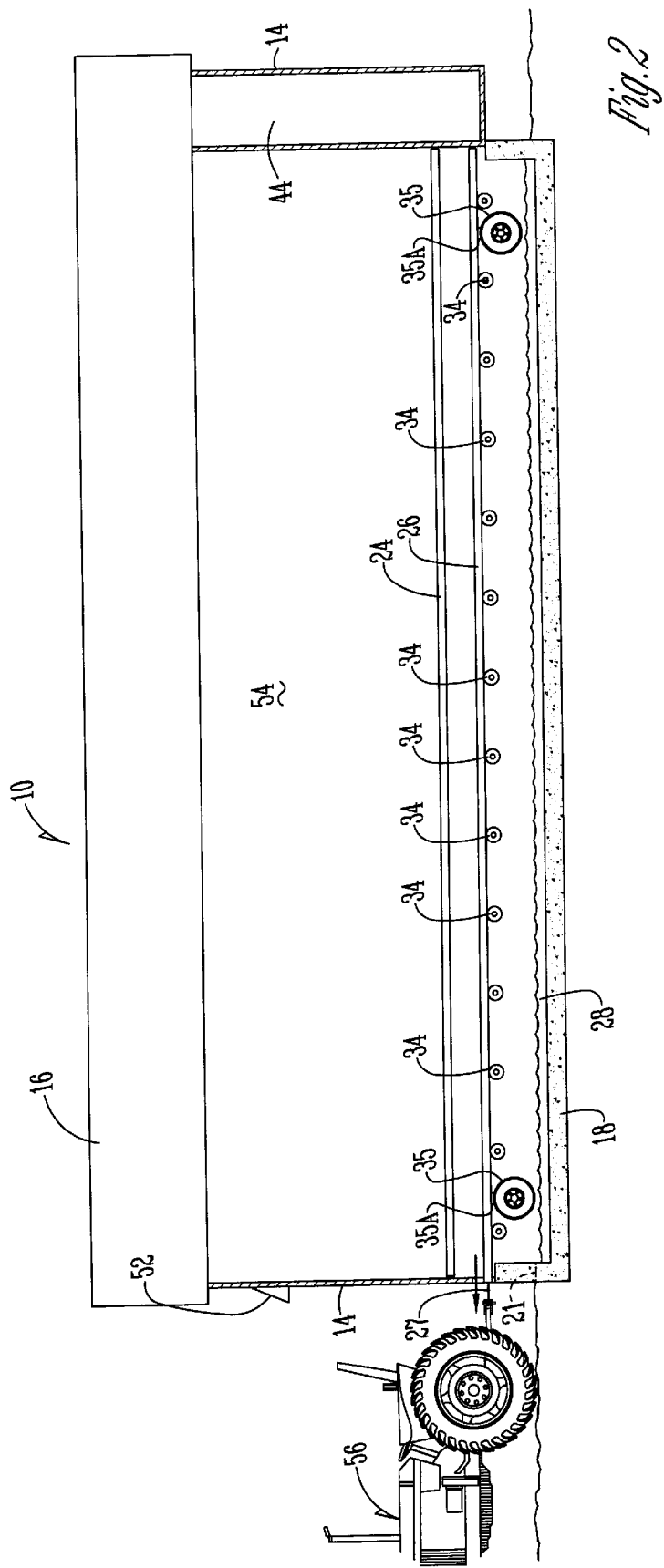
FIG. 2 is a cross sectional view of the animal containment unit of FIG. 1 showing the multiple levels of the waste treatment system.

The access area for waste removal 20 allows the user to remove the solid waste tray 26 by means of a removal connector 27. As seen in FIG. 2, a tractor 56 could connect with the removal connector 27 to facilitate easy removal of the solid waste tray 26. The solid waste tray 26 rests on a plurality of rollers 34 which allows for easy removal. The solid waste tray 26 rests on four wheel supports 35A which are connected to four independent wheels 35 which upon removal will fit through the wheel slots 21 and allow the solid waste tray 26 to be easily transported by the tractor 56 as if the solid waste tray 26 was a flat bed trailer.

The means for separating and removing waste are shown in FIG. 2. Animals in the living area 54 would stand or rest on the slotted flooring 24 through which waste would fall. Solid waste is collected on the solid waste tray 26 and liquid waste continues to fall into the liquid collection unit 28.

Figure 4:
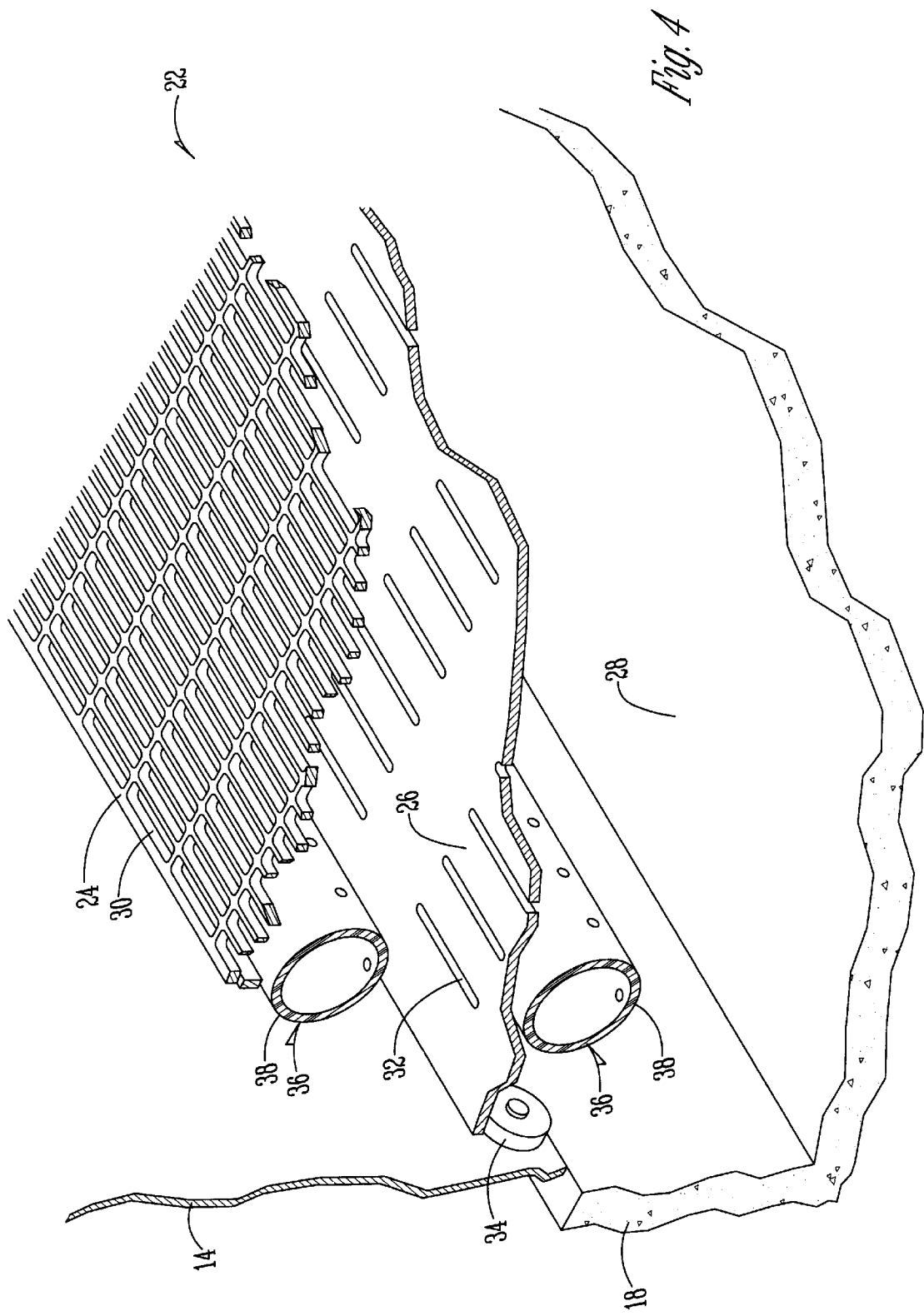
FIG. 4 is an exploded view of the waste treatment/removal system.

As is shown in FIG. 4, the waste treatment/removal system uses the slotted flooring 24 with rows of wide parallel slots 30 above a perforated tube 38, which is part of the air drying system 36, which is above the solid waste tray 26, which has rows of narrow parallel slots 32, and is above another perforated tube 38, another part of the air drying system 36, and rests on a plurality of rollers 34 attached to the wall 14 of the housing 10. The solid waste tray 26 is above the liquid collection unit 28, which consists of the inner portion of the base 18.

Figure 3:
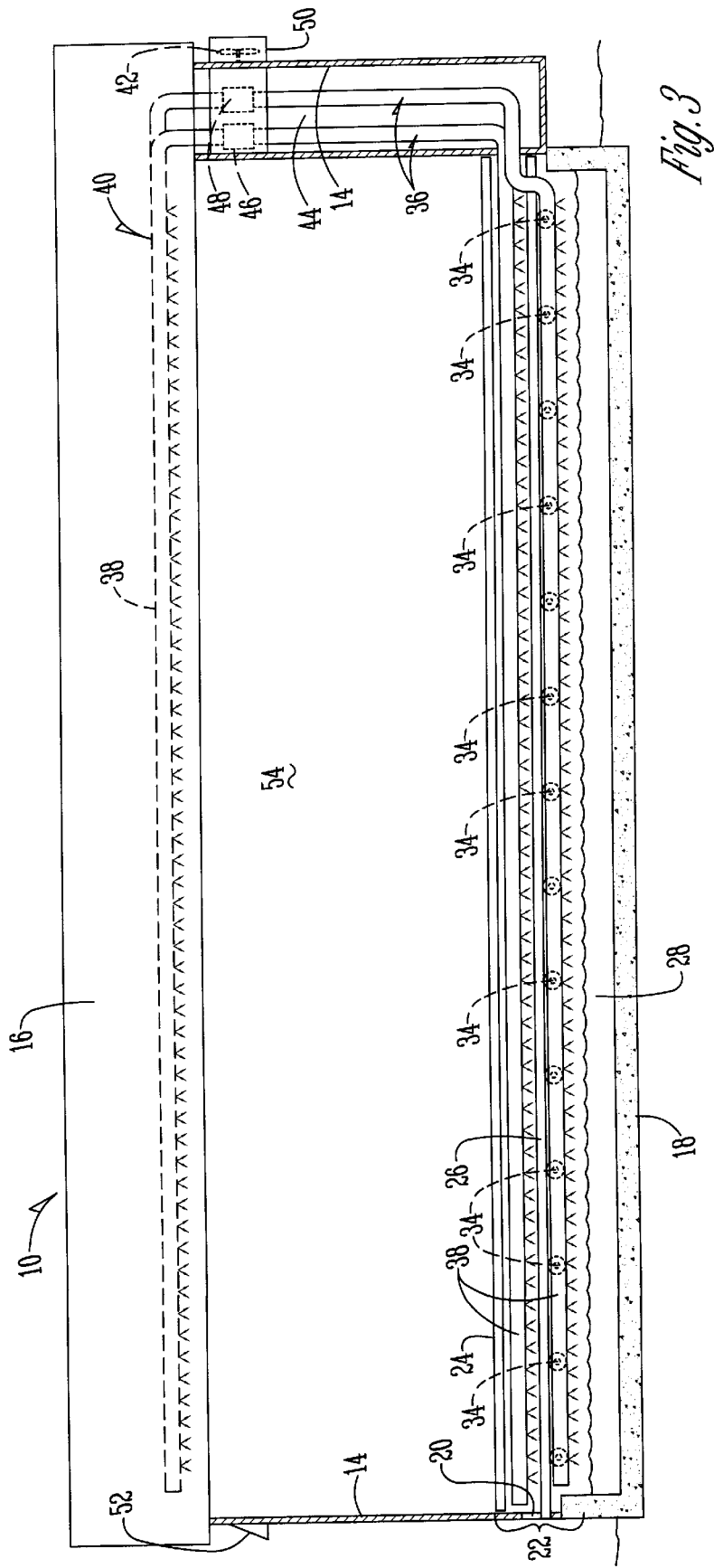
FIG. 3 is a cross sectional view of the animal containment unit of FIG. 1 showing the multiple levels of the waste treatment system of FIG. 2 coupled with an aired drying, chemical-free treatment system attached to a ventilation system of the housing unit.

As seen in FIG. 3, this air dying system 36 is attached to the ventilation unit 40 within the plenum chamber 44. Air is sucked in or pushed out of the plenum chamber 44 by the fan 42. Assuming the ventilation system 40 is operating in a positive pressure mode, air sucked in through the fan 42 is heated or cooled by either the heating unit 46 or the cooling unit 48 and then distributed through the air distribution system 50. Air is exhausted from the housing unit 10 at a controlled rate dictated by the size of the exhaust port 52.

What is claimed is:

1. An animal containment device adapted for breeding, gestation, farrowing, nursing, finishing, and holding animals comprising: a housing defining internal and external environments; a waste removal system comprising a slotted flooring of the housing, a narrowly slotted tray below said slotted flooring for the collection of solid waste, a solid tray below said narrowly slotted tray for the collection of liquid waste, and said solid tray having wheeled rollers and connectors attached thereto, to facilitate easy removal of said solid tray from the housing by way of a vehicle; a ventilation system coupled with said housing for control of internal environmental, temperature, pressure, humidity, and odor.

2. The device of claim 1 wherein said housing comprises:
   four walls, a roof and flooring;
   an access area for easy ingress/egress, and
   an access area for easy removal of waste products.

3. The device of claim 1 wherein said ventilation system is comprising:
   an intake/exhaust fan,
   a means for heating and cooling air,
   a distribution system, and
   an exhaust port.

4. The waste removal system of claim 1 wherein said narrowly slotted tray is easily removable.

5. The waste removal system of claim 1 wherein said solid tray is easily removable.

6. The device of claim 1 wherein said narrowly slotted tray and said solid tray are on rollers.

* * * * *